United States Patent
Osgood

(10) Patent No.: US 9,151,007 B2
(45) Date of Patent: Oct. 6, 2015

(54) QUICK-CONNECT SIDE WING PLOW HITCH

(71) Applicant: Ralph L. Osgood, Inc., Claremont, NH (US)

(72) Inventor: Kevin R. Osgood, Reading, VT (US)

(73) Assignee: Ralph L. Osgood, Inc., Claremont, NH (US)

( * ) Notice: Subject to any disclaimer, the term of this patent is extended or adjusted under 35 U.S.C. 154(b) by 0 days.

(21) Appl. No.: 14/279,893

(22) Filed: May 16, 2014

(65) Prior Publication Data

US 2014/0250738 A1    Sep. 11, 2014

Related U.S. Application Data

(62) Division of application No. 13/273,486, filed on Oct. 14, 2011, now Pat. No. 8,763,715.

(60) Provisional application No. 61/484,813, filed on May 11, 2011.

(51) Int. Cl.
    *E01H 5/06* (2006.01)

(52) U.S. Cl.
    CPC ............ *E01H 5/066* (2013.01); *E01H 5/06* (2013.01); *E01H 5/067* (2013.01)

(58) Field of Classification Search
    CPC ............ E01H 5/06; E01H 5/066; E01H 5/067
    See application file for complete search history.

(56) References Cited

U.S. PATENT DOCUMENTS

| | | | | |
|---|---|---|---|---|
| 3,659,363 A * | 5/1972 | Snyder | ............................. | 37/231 |
| 4,096,652 A * | 6/1978 | Raines et al. | ................... | 37/231 |
| 4,744,159 A * | 5/1988 | Houle | ............................. | 37/231 |
| 5,031,343 A * | 7/1991 | Houle et al. | ..................... | 37/231 |
| 6,249,992 B1 * | 6/2001 | Irving et al. | ..................... | 37/281 |
| 6,581,307 B1 * | 6/2003 | Jones et al. | ...................... | 37/281 |
| 2005/0257406 A1 * | 11/2005 | Savard | ............................. | 37/281 |
| 2013/0160333 A1 * | 6/2013 | Becicka et al. | ................. | 37/231 |

* cited by examiner

*Primary Examiner* — Jamie L McGowan
(74) *Attorney, Agent, or Firm* — Michael J. Weins; Jeffrey E. Semprebon

(57) ABSTRACT

A quick-release attachment system for connecting a wing plow to the side of a vehicle has a mounting block configured to couple to a conventional structure on the wing plow. A mounting block lifting and securing mechanism has a base element affixed to the vehicle and an extendable and retractable slider controlled by a slider actuator. A lift arm is pivotably mounted to the slider and is raised and lowered by a pivot actuator connected between the slider and the lift arm. When lowered, the lift arm can be positioned such that it engages and raises the mounting block when the lift arm is pivoted back to its raised position. The engagement allows the lift arm to carry the mounting block with it when the slider is retracted, drawing the mounting block into a bracket on the base element to which the mounting block can be secured.

5 Claims, 9 Drawing Sheets

QUICK-CONNECT SIDE WING PLOW HITCH

FIELD OF THE INVENTION

The present invention relates to hitches used to attach a snow plow to a vehicle, and configured to allow the plow to be readily removed when it is desired to use the vehicle for other purposes.

BACKGROUND OF THE INVENTION

For lighter plows such as are typically mounted to pick-up trucks, a variety of attachment systems have been developed that can be employed to mount a plow assembly. Two such patents teach a mounting for a plow that clamps onto a vehicle-mounted frame using upper and lower hooks in combination with guiding elements; these are U.S. Pat. Nos. 7,114,270 and 7,353,628. These patents share a common disclosure and teach a mount having a grasping mechanism which is guided into position as it closes by engagement of the upper hooks with an angled section of the vehicle-mounted frame and by engagement of angled surfaces on the lower hooks with corresponding surfaces on the vehicle-mounted frame, these surfaces both centering the grasping mechanism and guiding a lower bar of the vehicle-mounted frame into a trapped position. U.S. Pat. No. 4,236,329, which was cited during prosecution of these '270 patent, teaches a mount having opposed upper and lower hooks at a fixed separation that are engaged by parallel bars on the vehicle when these bars are moved to a maximum separation into engagement with the hooks. All of these mounts are designed for lighter plows. One of the benefits of the systems taught in the '270 and '628 patents is that, when the clamps are aligned with the bars (the truck is normal to the plow assembly) and the bars positioned therebetween (the truck is in close proximity to the plow), the engagement of the clamps with the bars will result in centering the plow with respect to truck.

For heavier duty plows, and particularly for plows having side wing attachments, a variety attachment systems have been developed. One such coupling device is taught in U.S. Pat. No. 4,744,159. One limitation of this system is that the drive actuators of the attachment mechanism reside on the vehicle even when the plow is detached. However, this patent again teaches a system where, if the plow coupling assembly is substantially aligned with the front of the truck and in close proximity thereto, the structure will center the plow with respect to the truck.

SUMMARY OF INVENTION

The invention is a quick-release mounting system suitable for use with snow plows, and well suited for heavy-duty plows; the system can be configured to be particularly beneficial for such plows when they include a side wing. The system can have two distinct mounting assemblies that have particular utility when used together, a front mounting assembly for attaching the structure associated with the front plow to the vehicle (as well attaching a tower that provides a coupling between the front of the vehicle and a wing plow, when such is included), and a side mounting assembly that provides coupling between the wing plow and the side of the vehicle. The front mounting assembly also provides benefits when used alone to mount a plow to the front of a vehicle when no side wing plow is employed.

The front mounting assembly has a vehicle-mounted frame affixable to the vehicle. The vehicle-mounted frame has a lower bar extending horizontally and having a lower bar front surface and a lower bar rear surface that have a maximum separation T, and a lower bar bottom. Attached to the lower bar of the frame is a pair of side plates. These side plates are normal to the lower bar and rise vertically therefrom. Each of the side plates has a forward projecting region which extends forward beyond the lower bar, providing a vertical bearing surface. An upper bar is attached to the side plates and spaced apart from the lower bar. The vehicle-mounted frame also has a lift bracket attached to the upper bar, and at least one vehicle-mounted frame coupler; the purposes of these elements is discussed later.

The front mounting assembly also has a plow-mounted frame with a substantially vertical body that is configured to couple to a plow. The plow-mounted frame has a guide bar with a guide bar upper surface, a guide bar lower surface, and a guide bar rear surface. The plow-mounted frame also has a pair of guide tabs mounted to the guide bar lower surface, each of the guide tabs having a guide tab upper surface. These tab upper surfaces in turn have an upper surface cradle section forming, in combination with the guide bar, a cradle for receiving the lower bar of the vehicle-mounted frame. The tab upper surfaces can each also have an upper surface inclined section which is inclined so as to guide the lower bar into the upper surface cradle section when the plow-mounted frame is raised into engagement with the vehicle-mounted frame.

A pair of upper guides are also attached to the guide bar upper surface. Each of the upper guides has an upper guide top section, which is inclined, and an upper guide base section, which is vertical and affixed to the guide bar. The upper guides are so positioned on the guide bar that the upper guide base sections can slidably engage the vertical bearing surfaces on the forward projecting regions of the side plates when the plow-mounted frame is moved into engagement with the vehicle-mounted frame. The upper guide top sections are symmetrical with respect to each other and inclined so as to direct the guide bar relative to the side plates to bring the upper guide base sections into slidable engagement with the side plates as the plow-mounted frame is raised into engagement with the vehicle-mounted frame.

The plow-mounted frame also has at least one plow-mounted frame coupler attached to the substantially vertical body so as to be vertically spaced from the guide bar.

A lift actuator is provided to draw the plow-mounted frame into engagement with the vehicle-mounted frame. The lift actuator is coupled to the guide bar and attachable to the lift bracket when the lift actuator is in an extended position, and after attachment can be contracted to draw the frames together. During the engagement process, the upper surfaces of the guide tabs engage the lower bar to provide fore-and-aft positioning while the upper guides engage the side plates to provide side-to-side positioning, these guide elements acting to direct the plow-mounted frame into a work position relative to the vehicle-mounted frame when the lift actuator is contracted to bring the guide bar rear surface against the lower bar.

At least one linking element is provided for engagement with the vehicle-mounted frame coupler and the plow-mounted frame coupler, and the linking element is configured to be secured to the vehicle-mounted frame and the plow-mounted frame so as to secure the frames together.

Means for blocking upwards motion of the plow-mounted frame with respect to the vehicle mounted frame when a work position is reached are provided, at which position at least a portion of the lower bar is engaged by the guide bar rear surface and by the upper surface cradle section of each of the guide tabs, and the upper guides engage the side plates.

Finally, means for blocking rotation of the plow-mounted frame with respect to the vehicle-mounted frame when the at least one linking element is secured in the couplers is provided. This means can be most conveniently provided by the engagement of the lower bar with the guide bar rear surface and the upper surface cradle section.

When a wing plow is employed in combination with a front plow which resides ahead of the vehicle, the wing plow is coupled both to the front plow and to the vehicle. The wing plow has a front section which is attached to a wing plow tower, which in turn is attached to the plow-mounted frame that supports the front plow. A side mounted linkage system connecting between the wing plow and the vehicle allows a rear section of the wing plow to be raised and lowered as well as to be moved toward and away form the vehicle to which the wing plow is coupled. When a quick-release mounting system is employed to attach the front plow to the vehicle, it is beneficial to also provide a quick-release attachment system for securing wing plow to the vehicle.

The side-mounting assembly of the present invention has a side wing mounting block which, in turn, has a side coupling structure that is configured to couple to the conventional side mounting linkage system associated with the wing plow, and has a mounting block lift element.

The side mounting assembly also has a mounting block lifting and securing mechanism which can be affixed with respect to a structural element of the vehicle and into which the side wing mounting block can be lockably engaged. The mounting block lifting and securing mechanism has a base element affixable to the vehicle, and configured to serve as a bracket into which the side wing mounting block can be mounted. The mounting block lifting and securing mechanism also has a slider translatably mounted to the base element so as to be extendable and retractable with respect to the vehicle. A slide actuator is operably connected to the base element and the slider to translate the slider with respect to the vehicle. A lift arm pivotably mounted to the slider and has an arm lift element that is engagable with the mounting block lift element.

A pivot actuator is operably connected between the slider and the lift arm for selectively lowering and raising the lift arm. The lift elements are configured such that, when the arm lift element is placed under the mounting block lift element and thereafter raised, the arm lift element engages the mounting block lift element so as to support and carry the mounting block lift element. Thus, when the lift arm is lowered and the slider extended to place the arm lift element under the mounting block lift element, subsequently pivoting the lift arm to its raised position acts to lift and carry the side wing mounting block with the lift arm, via the engagement of the lift elements. The slider can then be retracted to draw the lift arm and the side wing mounting block into the base element.

Means for assuring that the mounting block is brought into alignment with respect to the base element as the slider is retracted so as to translate the lift arm and the mounting block toward the vehicle and carry the mounting block into the base element are provided, as well as means for securing the mounting block with respect to the base element when aligned therewith and residing therein. Securing the mounting block in the base element rigidly attaches the side coupling structure to the vehicle, allowing the side mounted linkage system for the wing plow to be coupled to the vehicle.

BRIEF DESCRIPTIONS OF THE FIGURES

FIG. 1 is a partially exploded isometric view of one embodiment of a quick release front mounting assembly of the present invention. This embodiment is configured for use of a plow that has a fixture for attaching a side wing plow, and includes structure for coupling to a side wing tower that, in turn, attaches to the front of such a side wing plow. The front mounting assembly has a vehicle-mounted frame and a plow-mounted frame, which are illustrated before being drawn into registry by a lift actuator. The lift actuator is a hydraulic cylinder that is pivotally attached to the plow-mounted frame and terminates in a hook that can be manually engaged with a lift bracket on the vehicle-mounted frame. Once engaged, the lift actuator can be contracted to draw the frames together, and guides serve to align the frames as they are drawn together.

FIG. 2 is an isometric view of section 2-2 of FIG. 1 after the hook has been placed into engagement with the lift bracket, but before the lift actuator has been contracted.

FIG. 3 is an isometric view of the section 2-2 after the plow-mounted frame has been urged toward the vehicle-mounted frame by contraction of the lift actuator. In this position, guide tabs (only one of which is shown) on the plow-mounted frame engage a rectangular lower bar on the vehicle-mounted frame to guide the lower bar into a cradle formed, in part, by the guide tabs to provide fore-and-aft registry of the frames. Upper guides (only one of which is shown) on the plow-mounted frame are positioned to engage inner vertical bearing surfaces of side plates on the vehicle-mounted frame to provide centering of the frames with respect to each other. Upper guide top sections are inclined to urge the guide bar to a centered position relative to the side plates, and upper guide base sections subsequently slidably engage the vertical bearing surfaces to maintain such centering.

FIG. 4 is an isometric view of section 2-2 when the two frames have been engaged and drawn into a work position with respect to each other, where the lower bar of the vehicle-mounted frame is engaged in the cradle of the plow-mounted frame, and the upper guides engage the side plates. In this position, slides mounted to the plow-mounted frame can be extended and secured to paired tabs on the vehicle-mounted frame to secure the frames together. The engagement of the lower bar in the cradle prevents rotation about the axis of the securing pins. Once the frames are locked together, hydraulic pressure in the lift actuator can be released.

FIG. 5 is an isometric view of the front mounting assembly shown in FIGS. 1-4, with a side wing tower for coupling to a side wing plow attached to the plow-mounted frame. The front tower places an asymmetrical load on the plow-mounted frame, and to help balance the forces when the frames are drawn together, the lift bracket and the lift actuator are offset from the center toward the side of the vehicle on which the side wing plow is to be mounted.

FIG. 6 is an isometric view of an alternative embodiment of the present invention which shares many features in common with the embodiment shown in FIGS. 1-5, but which is designed for mounting a front plow that is used without a side wing plow. In this embodiment, the lift actuator and the lift bracket are centrally located to balance forces as the plow-mounted frame is brought into registry with the vehicle-mounted frame. This embodiment also shows an alternate structure for the upper guides used to center the frames; in this embodiment, the upper guides engage outer vertical bearing surfaces of the side plates.

FIG. 7 is a partial isometric view showing another embodiment of a front mounting assembly; the partial view of FIG. 7 is similar to the view shown in FIG. 2. In this embodiment, the frames employ round bars, the lift actuator terminates in a transverse pin that engages a hook-like lift bracket on the vehicle-mounted frame, and pivoting link arms are employed in place of slides to provide link elements to pin the frames together.

FIG. 8 is a partial view showing an alternative structure for the link arm pivotably attached to the plow-mounted frame and the associated receiver affixed to the vehicle-mounted frame. In this embodiment, the link arm terminates in a hook that engages a fixed transverse pin on the receiver.

FIGS. 9-13 illustrate one embodiment of a side mounting assembly that can be employed to connect the rear of a side wing plow to a vehicle, and is designed for use in combination with the front mounting assembly of the present invention. The side mounting assembly has a side wing mounting block that is configured to allow coupling to the wing plow and to in turn be picked up by a pivoting, translating lift arm. Once picked up, the mounting block is brought into alignment with a base element, to which it is secured by pins. FIG. 9 shows the side mounting assembly when the lift arm has been pivoted to a lowered position, but has not been translated away from the base element.

Figure 11:
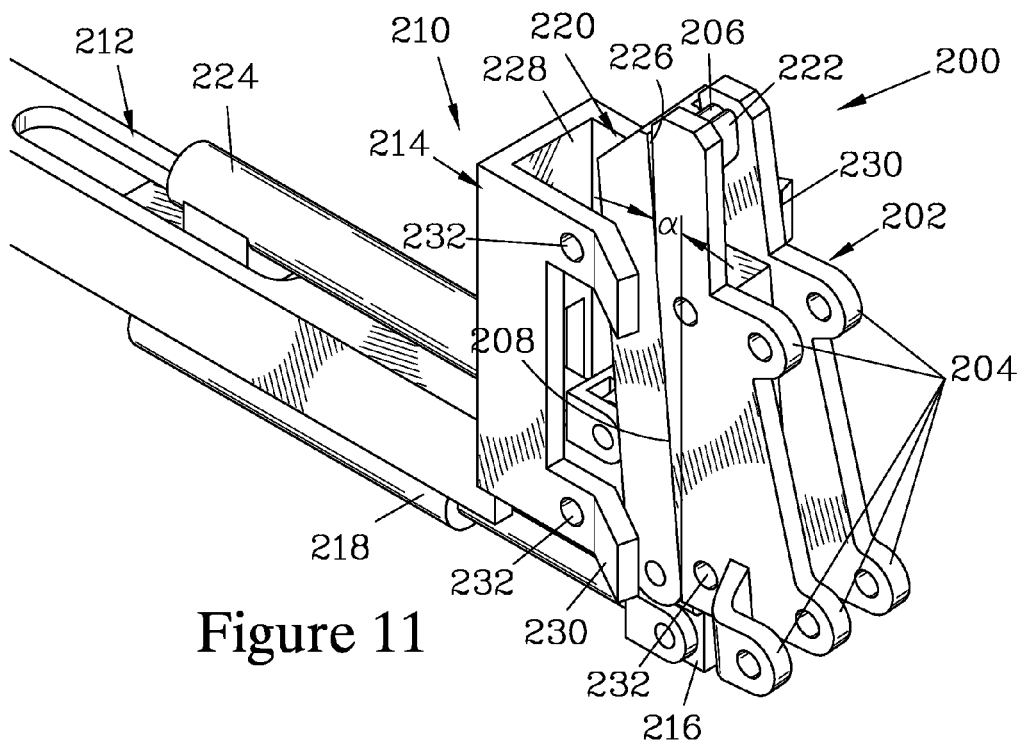
FIG. 11 illustrates the embodiment shown in FIGS. 9 and 10 when the lift arm has been pivoted upwards past vertical to a slightly inclined position, lifting the side wing mounting block to a position where its weight is supported on the lift arm.
Figure 12:
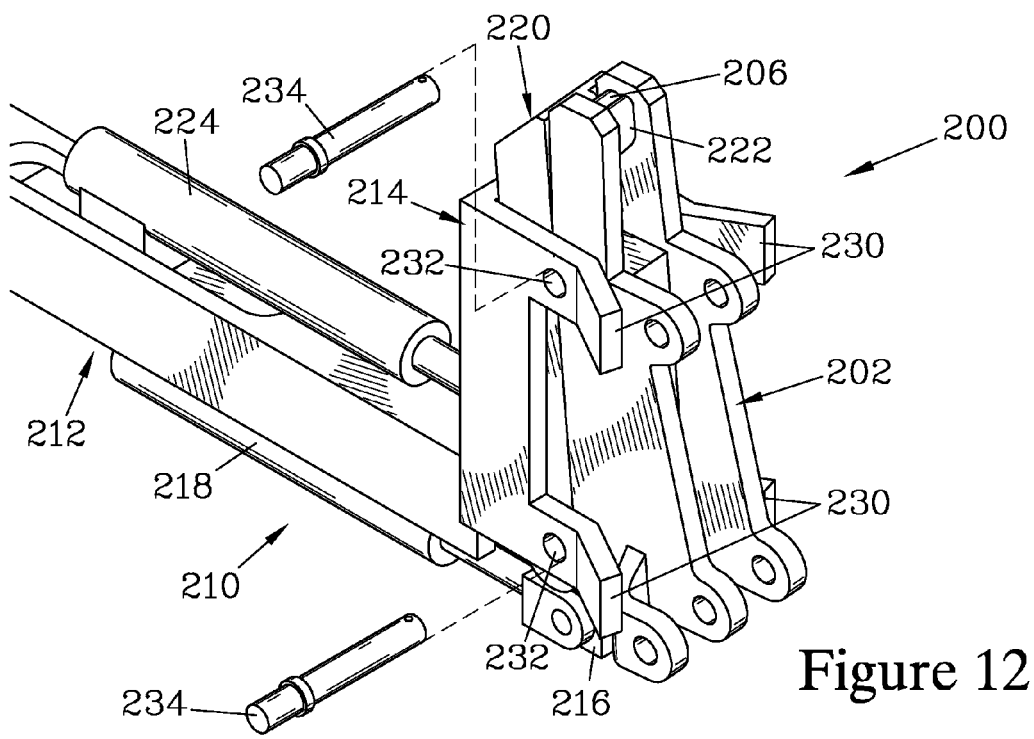
FIG. 12 illustrates the embodiment shown in FIGS. 9-11 when the slider and the lift arm attached thereto have been translatably retracted to pull the side wing mounting block to bring a portion of the side wing mounting block into engagement with a bracket on the base element. The lift arm and the side wing mounting block remain slightly inclined.
Figure 13:
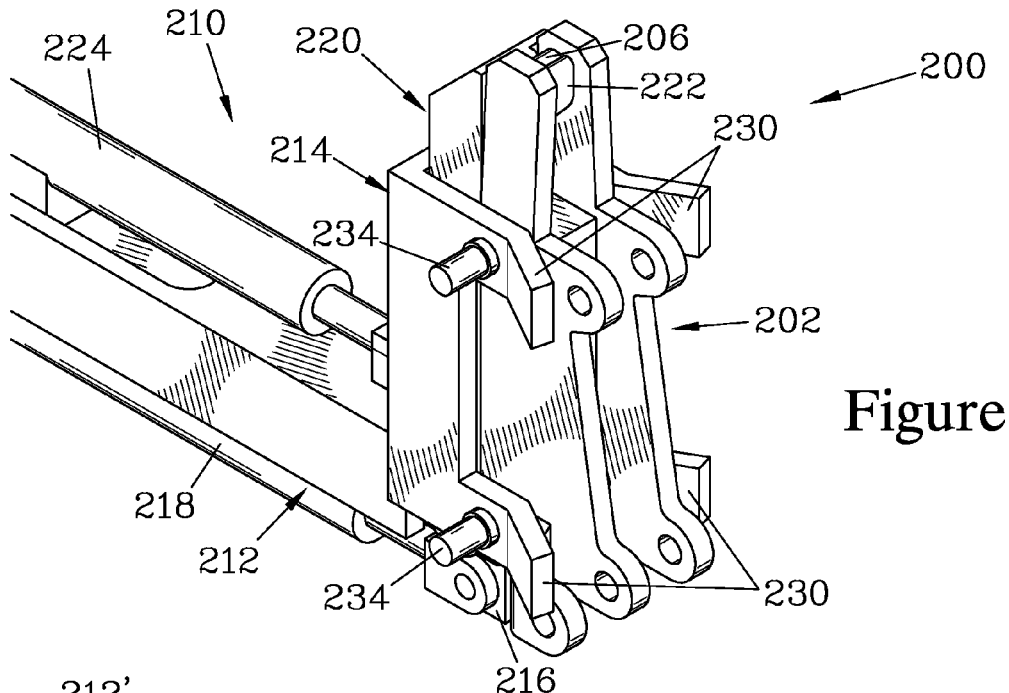

FIG. 13 illustrates the embodiment shown in FIGS. 9-12 when the side wing mounting block has been pulled further into the bracket. As the slider is fully retracted, the side wing mounting block is brought to a substantially vertical position in the bracket. In this vertical position, pins can be inserted through aligned passages through the side wing mounting block and the bracket to secure them together.

Figure 14:
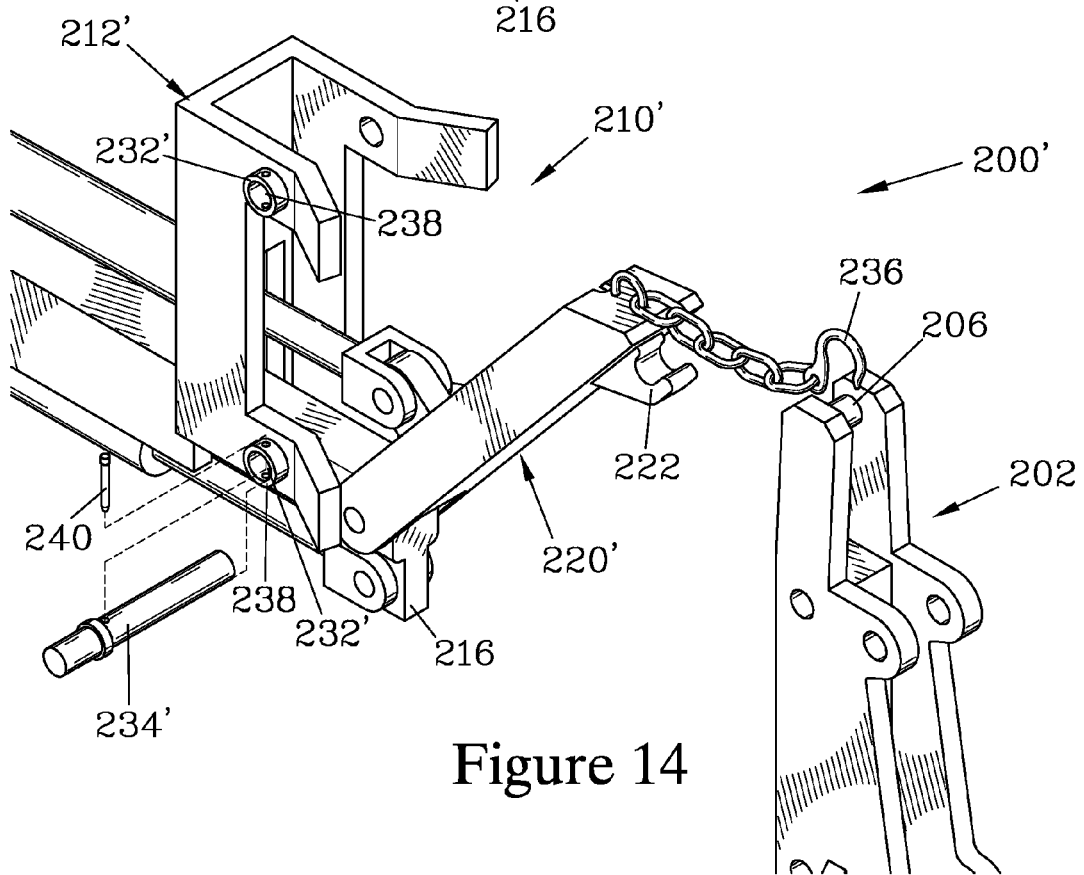

FIG. 14 illustrates an embodiment similar to that shown in FIGS. 9-13, but which includes a chain hook attached to the lift arm to provide greater freedom in positioning the side wing mounting block. If the side wing mounting block is located beyond the reach of the lift arm when the slider is extended, the chain hook is placed into engagement with the side wing mounting block after the lift arm has been pivoted downward. Pivoting the lift arm upwards then causes the chain hook to pull the side wing mounting block closer to the base element, to a position where it can then be engaged by the lift arm and secured into the bracket following a sequence such as illustrated in FIGS. 9-12. This embodiment also shows extensions of the passages in the bracket to facilitate securing the pins that attach the mounting block thereto.

DETAILED DESCRIPTION OF THE PREFERRED EMBODIMENTS

Figure 1:
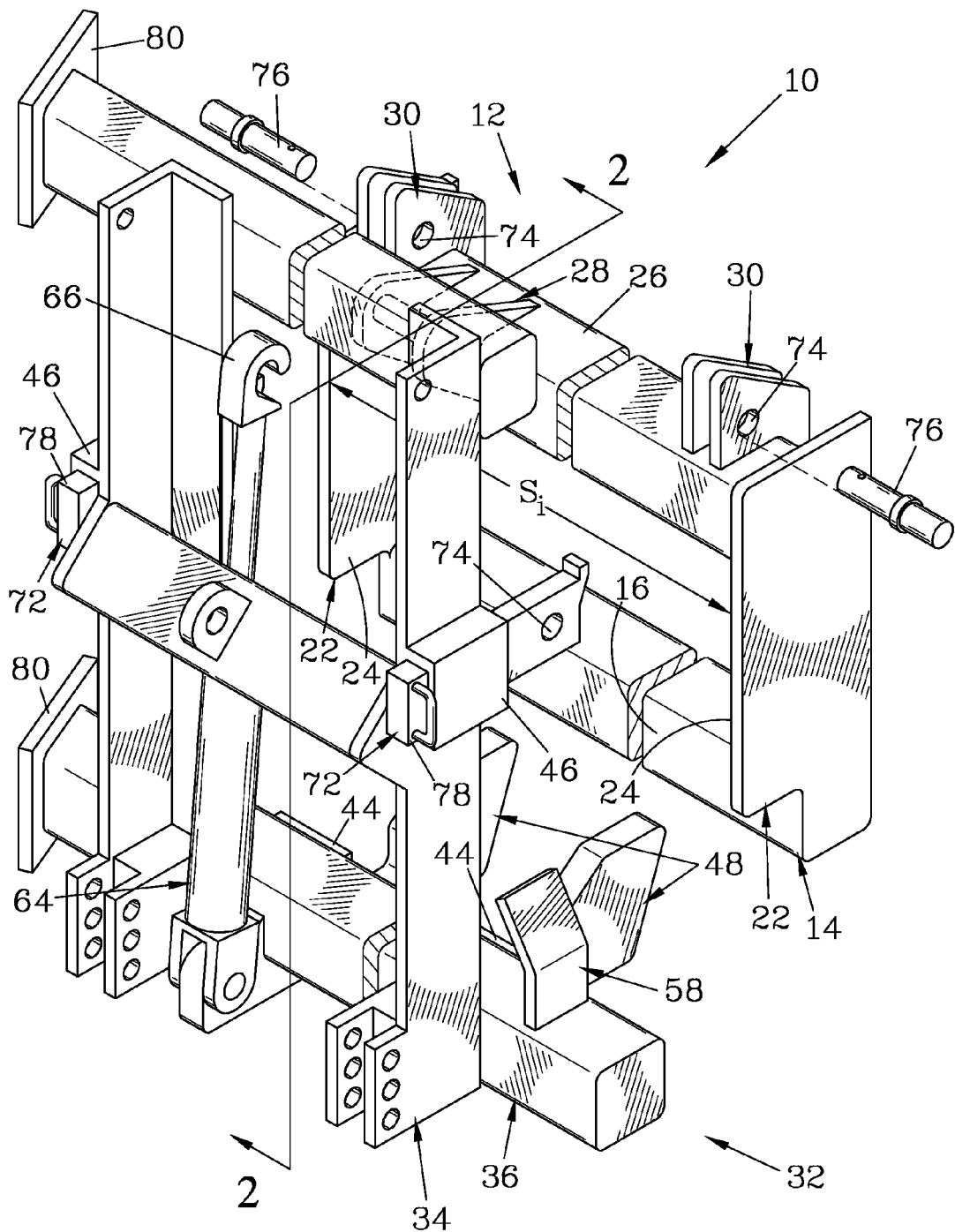

FIG. 1 is an exploded isometric view of one embodiment of a quick release front mounting assembly 10 for providing at least a part of a quick attachment system for mounting a plow assembly (not shown) to a vehicle (also not shown). FIGS. 2-5 show partial isometric views of the front mounting assembly 10 in use.

Figure 7:
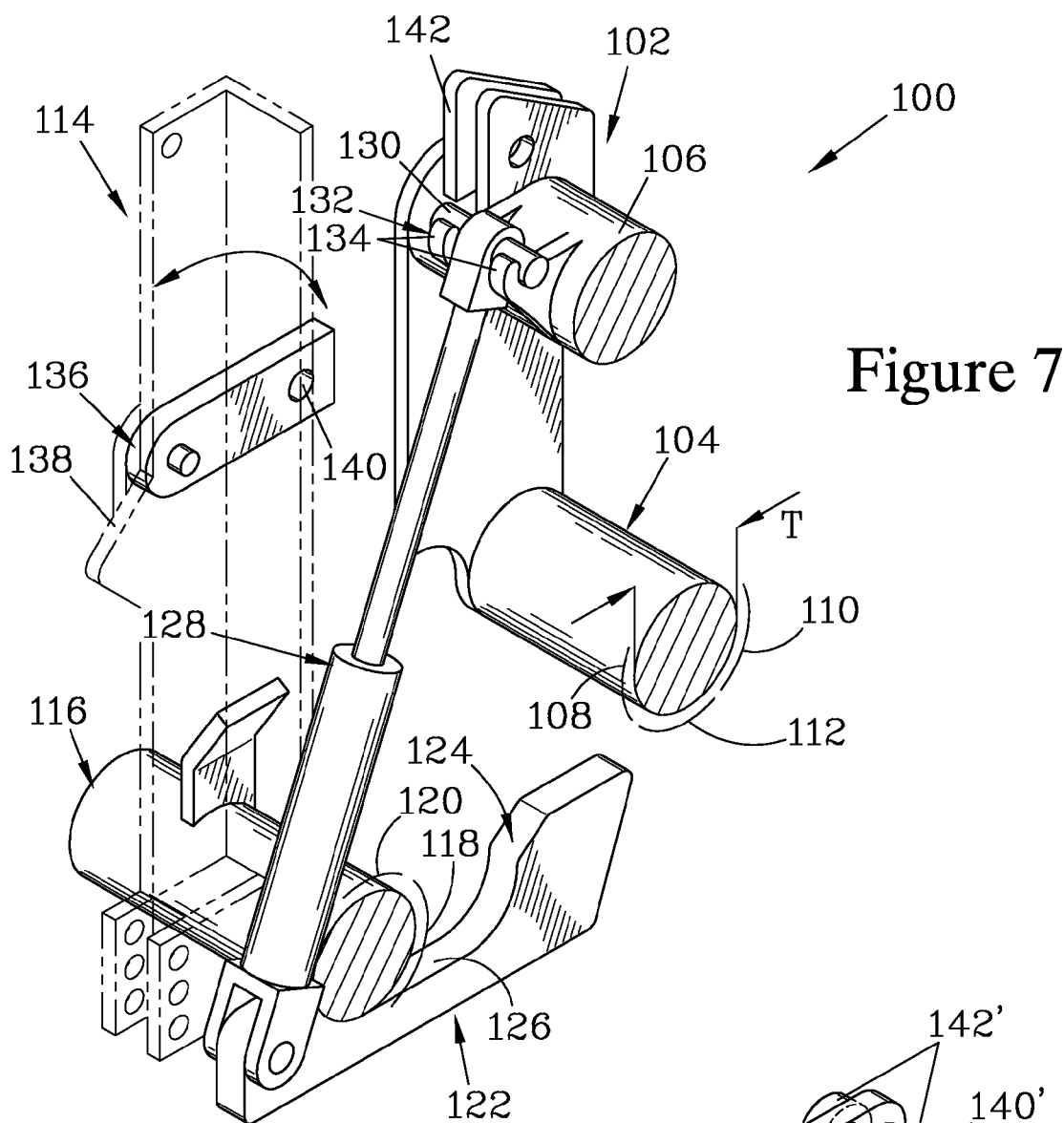

The front mounting assembly 10 has a vehicle-mounted frame 12 that can be affixed to the vehicle, typically by attaching members of the vehicle-mounted frame 12 to attachment points conventionally provided on the vehicle for mounting a plow or similar implement thereto. The vehicle-mounted frame 12 has a lower bar 14 which extends horizontally. The lower bar 14 shown is rectangular, having a lower bar front surface 16 and a lower bar rear surface 18, which are separated by a lower bar thickness T (labeled in FIG. 2), and a lower bar bottom surface 20. It should be appreciated that other bar configurations could be employed, in which case the effective thickness T is defined by the maximum separation; for example, if the lower bar is round (as shown in FIG. 7 below), the thickness T is the separation between two vertical tangent planes.

The vehicle-mounted frame 12 also has a pair of side plates 22 that are affixed with respect to the lower bar 14 and extend normally thereto. These side plates 22 are vertical, having inward-facing vertical bearing surfaces 24 that are positioned at an inner separation $S_1$ from each other. Each of the side plates 22 has a forward-projecting region that extends forward beyond the lower bar front surface 16. An upper bar 26 is attached to the side plates 22 and spaced apart from the lower bar 14. A lift bracket 28 and two pairs of slide-receiving tabs 30 are affixed to the upper bar 26, the tabs 30 serving to provide a pair of vehicle-mounted frame couplers as further discussed below. In the front mounting system 10, the lift bracket 28 is located in an offset position where it is displaced from the center of the vehicle as discussed below with regard to FIG. 5.

The front mounting assembly 10 is also provided with a plow-mounted frame 32 which has a substantially vertical body 34 configured to be coupled to a plow (not shown). The plow-mounted frame 32 has a guide bar 36, which again is shown as a rectangular bar, having a guide bar upper surface 38, a guide bar lower surface 40, and a guide bar rear surface 42. The guide bar rear surface 42 engages the lower bar front surface 16 when the two frames (12, 32) are engaged. Preferably, at least one of these surfaces (16, 42) is a discontinuous surface to accommodate trapped snow and/or ice that might otherwise prevent these surfaces (16, 42) from being drawn into contact. In the front mounting assembly 10, the guide bar rear surface 42 is formed on a pair of blocks 44 to provide such a discontinuous surface. While these blocks 44 are illustrated in FIG. 1 as being affixed to the guide bar 36, it should be appreciated that they could alternatively be affixed to the front surface 16 of the lower bar 14 of the vehicle-mounted frame 12 to provide a discontinuous lower bar front surface. The plow-mounted frame 32 is also provided with a pair of slide mounts 46, which serve to provide a pair of plow-mounted frame couplers, the purpose of which is discussed below.

Figure 2:
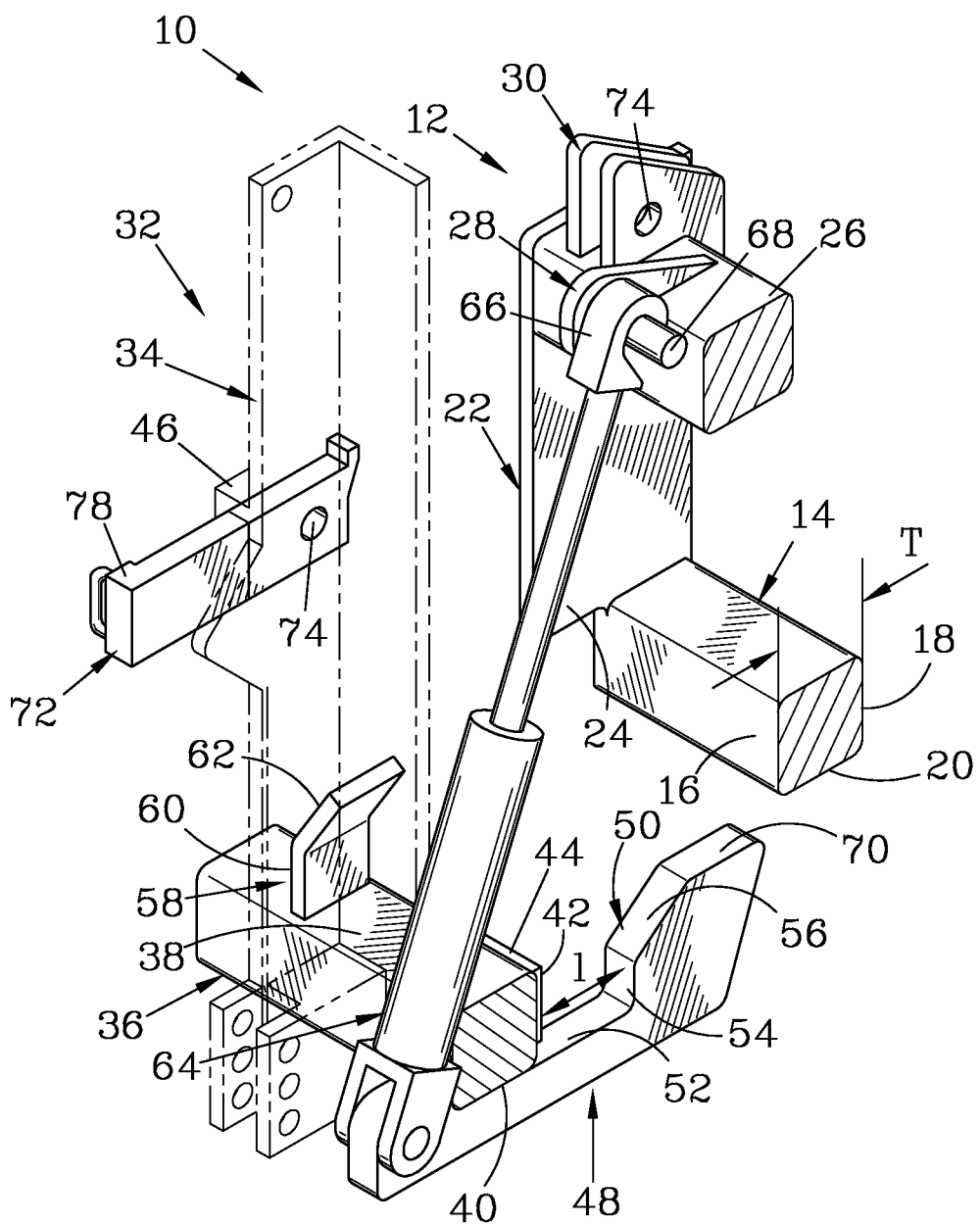

A pair of guide tabs 48 attach to the guide bar lower surface 40 of the plow-mounted frame 32. As shown in FIG. 2, each of the guide tabs 48 has a guide tab upper surface 50 with a portion designed to provide, in combination with the guide bar rear surface 42, a cradle for receiving the lower bar 14 of the vehicle-mounted frame 12. In this embodiment, where the lower bar 14 is rectangular, the guide tab upper surface 50 has an upper surface first section 52 extending normally to the guide bar rear surface 42 so as to be horizontal, and an upper section second surface 54 which is normal to the upper surface first section 52. The upper surface first section 52 has a length L sufficient to accommodate the thickness T of the lower bar 14 interposed between the upper surface second section 54 and the guide bar rear surface 42, forming a cradle for the lower bar 14. To help guide this cradle into contact with the lower bar 14 when the plow-mounted frame 32 is raised into registry with the vehicle-mounted frame 12 (as discussed below and as illustrated in FIGS. 2-4), an upper surface third section 56 of the upper surface 50 is provided, which is inclined with respect to the upper surface first section 52.

In addition to the pair of guide tabs 48 attaching to the plow-mounted frame 32, a pair of upper guides 58 are attached to the guide bar upper surface 38 of the guide bar 36. These upper guides 58 have a first section 60 which is vertical and normal to the guide bar upper surface 38 and are attached thereto. A second section 62 extends the upper guides 58, and in this embodiment the second sections 62 are canted inward. The upper guides 58 are positioned such that the first sections 60 are separated by the inner separation $S_i$ and will therefor slidably engage the forward-projecting regions of the side plates 22 when the plow-mounted frame 32 is drawn toward the vehicle-mounted frame 12, with the upper guides 58 engaging the inward-facing vertical bearing surfaces 24 of the side plates 22.

To lift the vehicle-mounted frame 12 and draw it into engagement with the plow-mounted frame 32, a lift actuator 64 is provided. The lift actuator 64 is coupled to the guide bar 36, and can be manually engaged with the lift bracket 28 mounted to the upper bar 26. The lift actuator 64 illustrated is a hydraulic cylinder. The details of how the lift actuator 64 provides the relative motion of the frames (12, 32) is illustrated in FIGS. 2-4. The lift actuator 64 is pivotally attached to the plow-mounted frame 32 and, in this embodiment, terminates in a hook 66 that is configured to be engaged with a transverse rod 68 that forms a part of the lift bracket 28. When the lift actuator 64 is extended, the hook 66 is manually engaged with the lift bracket 28 by the user, providing greater freedom in positioning and alignment of the frames (12, 32) to be attached together, and thereby reducing the need for precision in positioning the vehicle in preparation to mounting the plow thereto. Once the hook 66 has been engaged, as shown in FIG. 2, the operator activates the lift actuator 64 so as to reduce its length and draw the two frames (12 and 32) into closer proximity, as shown in FIGS. 3 and 4.

Figures 3, 4:
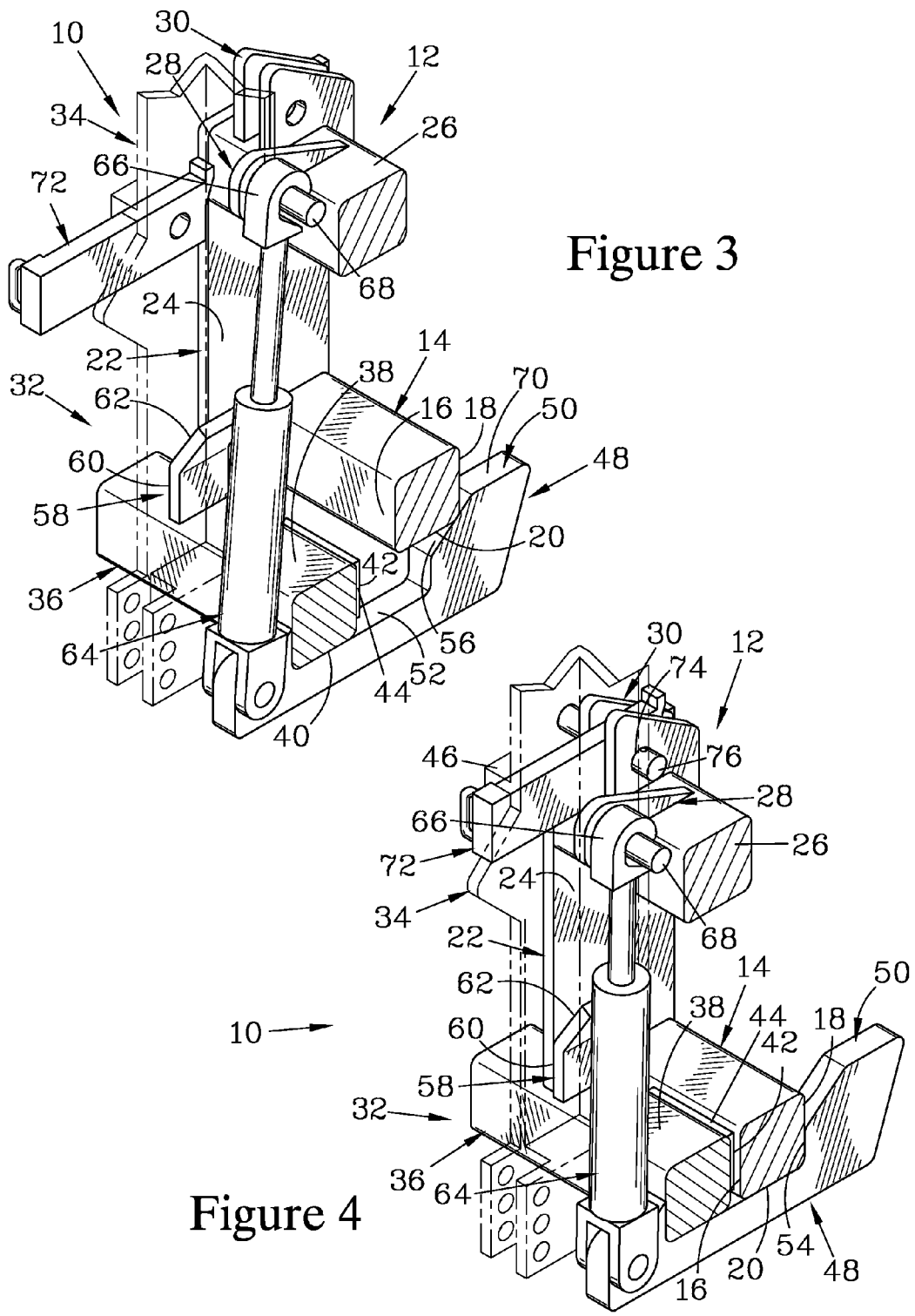

FIG. 3 illustrates the relative positions of the two frames (12, 32) when they have been drawn together a sufficient distance to draw the lower bar 14 into engagement with the upper surface third section 56 of the upper surface 50 of the guide tab 48, which is inclined with respect to the upper surface first section 52. Additionally, the second section 62 of the upper guide 58 is positioned to engage the inward facing vertical bearing surface 24 of one of the side plates 22 as needed to center the plow-mounted frame 32 relative to the vehicle-mounted frame 12.

To accommodate a greater degree of horizontal spacing between the frames (12, 32), the upper surface 50 of the guide tabs 48 can be provided with an upper surface fourth section 70 that extends beyond the upper surface third section 56 to prevent the guide tabs 48 from being lifted past the lower bar 14 of the vehicle-mounted frame 12 without engagement.

FIG. 4 illustrates the front mounting assembly 10 when the two frames (12, 32) have been brought into a work position where the lower bar 14 is positioned with the lower bar front surface 16 engaged with the guide bar rear surface 42 and the lower bar rear surface 18 engaged with the upper surface second sections 54 of the guide tabs 48.

Means for limiting the upward motion of the plow-mounted frame 32 relative to the vehicle-mounted frame 12 are provided to define the work position and register the two frames (12, 32) with respect to each other before securing the frames (12, 32) together. Such means for limiting can be conveniently provided by either engagement of the lower bar bottom surface 20 against the upper surface first sections 52 of the guide tabs 48, by engagement of the side plates 22 with the guide bar upper surface 38, or both.

As noted above, the vehicle-mounted frame 12 is provided with paired slide-receiving tabs 30 and the plow-mounted frame 32 is provided with slide mounts 46, these elements serving as couplers. To secure the plow-mounted frame 32 to the vehicle-mounted frame 12 when the frames (12, 32) have been registered with respect to each other in the work position, a pair of slides 72 are provided to serve as link elements. Each of the slides 72 slidably engages one of the slide mounts 46 on the plow-mounted frame 32. The slide mounts 46 are positioned such that, when the plow-mounted frame 32 is in the work position relative to the vehicle-mounted frame 12, the slide mounts 46 direct the slides 72, when extended therefrom, into the slide-receiving tabs 30. The slides 72 and the tabs 30 are provided with passages 74 that can be aligned to receive securing pins 76, these pins 76 serving to secure the slides 72 to the tabs 30, while slide blocks 78 on the slides 72 serve to secure the slides 72 to the slide mounts 46. Thus, the slides 72 serve as linking elements that engage the couplers (tabs 30 and slide mounts 46) on the frames (12, 32) and can be secured thereto in order to secure the frames (12, 32) together.

To provide a rigid mounting of the plow relative to the vehicle, means for blocking rotation of the plow-mounted frame 32 with respect to the vehicle-mounted frame 12 when the slides 72 are secured to the tabs 30 and the slide mounts 46 are provided. In the front mounting assembly 10, relative rotation between the frames (12, 32) about the axis of the securing pins 76 is blocked by the engagement of the lower bar 14 against the guide bar 36 and the guide tabs 48.

Figure 5:
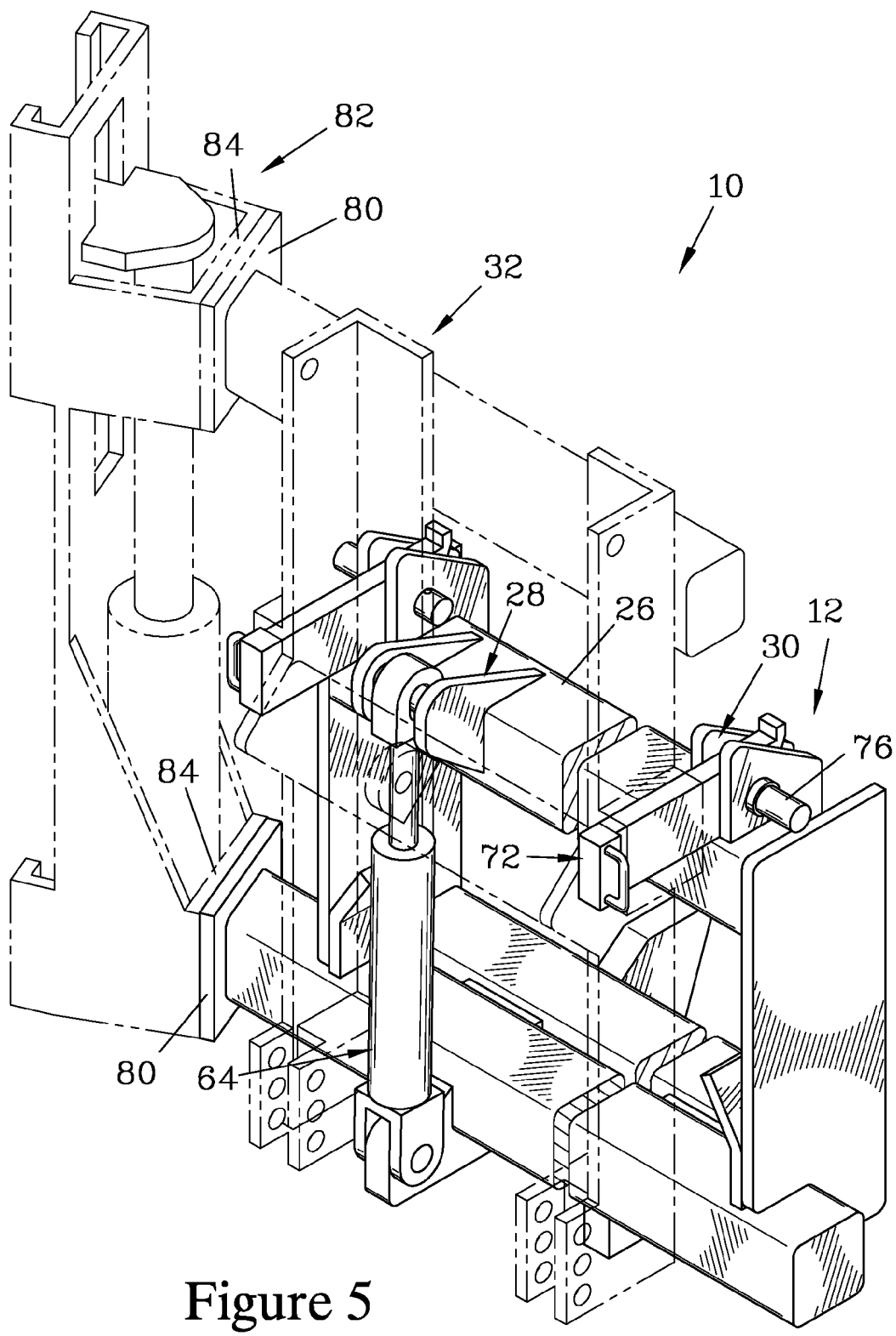

When a wing plow such as is shown in U.S. Pat. No. 4,744,159 is to be mounted along the side of the vehicle, the plow-mounted frame 32 includes suitable tower mounting brackets 80 on one side, to which a wing plow tower 82 is mounted, as shown in FIG. 5. The wing plow tower 82 is configured to provide structure for coupling to the front end of a side wing plow (not shown). Such a wing plow tower 82 allows the front of the wing plow (not shown) to be selectively raised or lowered. The tower 82 has flanges 84 for affixing the tower 82 to the tower mounting brackets 80.

Because the wing plow tower 82 and the wing plow structure coupled thereto place an off-center load on the plow-mounting frame 32, the lift actuator 64 is affixed to the plow-mounted frame 32 in a position that is offset from the center toward the side on which the tower mounting brackets 80 are placed. Similarly, the lift bracket 28 is offset from the center of the vehicle-mounted frame 12. The offset of the lift bracket 28 and the lift actuator 64 helps to balance forces when the lift actuator 64 is activated to raise the plow-mounted frame 32 into registry with the vehicle-mounted frame 12.

Figure 6:
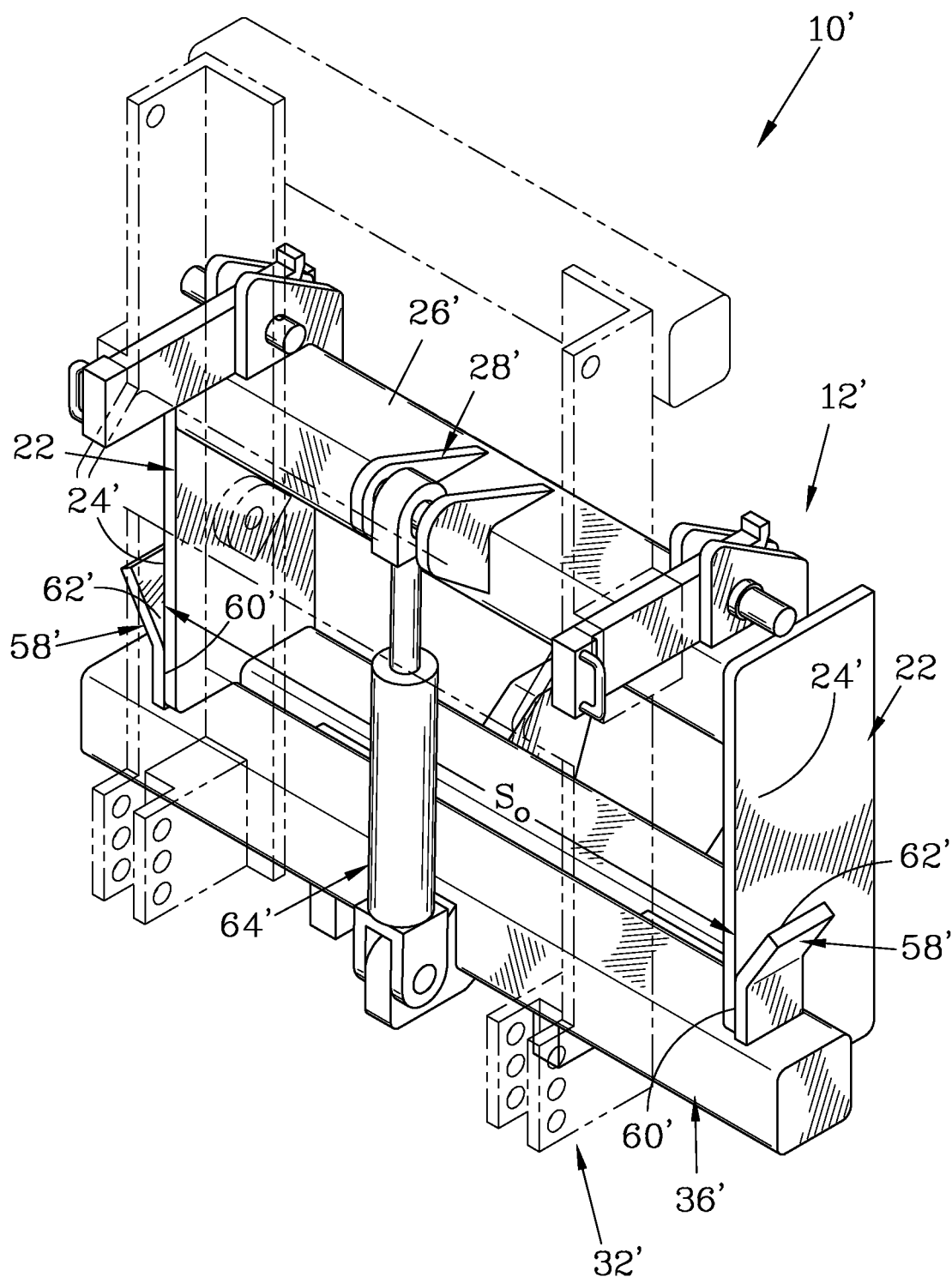

FIG. 6 illustrates an alternative quick-release front mounting assembly 10' that shares many features in common with the front mounting assembly 10 discussed above, but which is designed for use mounting a plow to the front of a vehicle for use without a side wing plow. Thus, there is no mounting structure on the plow-mounted frame 32' for attaching a wing plow front mounting structure. In this case, to balance the forces when lifting the plow-mounted frame 32' into registry with the vehicle-mounted frame 12', the lift actuator 64' is centrally mounted with respect to the plow-mounted frame 32', and the lift bracket 28' is centrally positioned on the upper bar 26' of the vehicle-mounted frame 12'.

The front mounting assembly 10' also illustrates an alternative configuration of the upper guides 58'. In this embodiment, the upper guides 58' are configured to engage outer bearing surfaces 24' of the side plates 22, which have an outer separation $S_o$, rather than the inner surfaces 24. Each of the upper guides 58' has a first section 60', which attaches to the guide bar 36', and has a second section 62', where the second sections 62' are inclined away from each other as their height increases so as to provide sloped surfaces to engage the outer bearing surfaces 24' of the side plates 22 to help center the plow-mounted frame 32' with respect to the vehicle-mounted frame 12'.

FIG. 7 is a partial isometric view of a front mounting assembly 100 that forms another embodiment of the present invention; the view of FIG. 7 is similar to the view of FIG. 2 discussed above. The front mounting assembly 100 functions in a similar manner to the assembly 10, but differs in some of the details of its structure. The front mounting assembly 100 has a vehicle-mounted frame 102 having a lower bar 104 and an upper bar 106 that are formed of round, rather than rectangular stock. As a result, a lower bar front surface 108, a lower bar rear surface 110, and a lower bar bottom surface 112 are sections of a continuous cylindrical surface, rather than discrete surfaces, and the lower bar 104 has an effective thickness T defined by the maximum separation between the lower bar front surface 108 and the lower bar rear surface 110.

Similarly, a plow-mounted frame 114 has a guide bar 116 that is round, having a guide bar rear surface 118 and a guide bar upper surface 120 that are sections of a continuous cylindrical surface. A pair of guide tabs 122 (only one of which is shown) are mounted to the guide bar 116, each having a guide bar upper surface 124 with an upper surface cradle section 126 configured to provide, in combination with the guide bar rear surface 118, a cradle for the lower bar 104. When the frames (102, 114) are secured together as discussed below, the engagement between the lower bar 104 and the cradle formed by the upper surface cradle section 126 and the guide bar rear surface 118 provides means for blocking rotation of the frames (102, 114) with respect to each other.

The front mounting assembly 100 also differs in that it employs a lift actuator 128 that terminates in a transverse bar 130, while the vehicle-mounted frame 102 is provided with a lift bracket 132 formed by a pair of hooks 134, with which the transverse bar 130 can be engaged.

An additional difference in the front mounting assembly 100 is the use of pivoting link arms 136 (only one of which is shown) as linking elements to secure together the frames (102, 114). The link arms 136 are each pivotally engaged at one end to a substantially vertical body 138 of the plow-mounted frame 114, and having a passage 140 at the other end which can be pinned to a pair of arm-receiving tabs 142 affixed to the vehicle-mounted frame 102 to secure the link arms 136 thereto.

Figure 8:
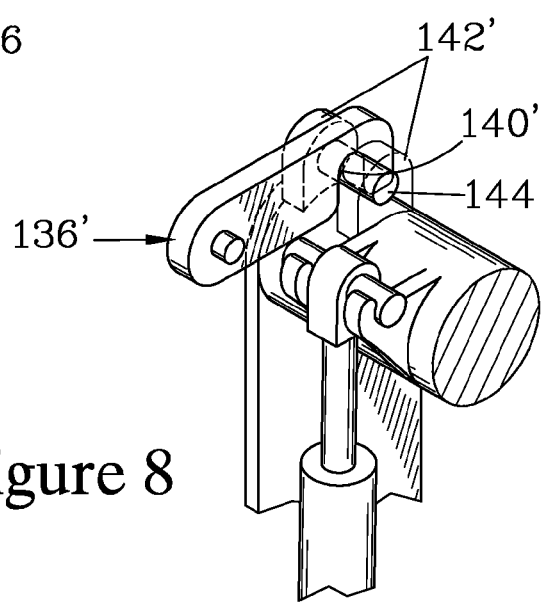

While the use of pins to secure the linking elements to at least one of the frames provides a secure connection, alternate connections could be employed. As one example, FIG. 8 illustrates a pivoting link arm 136' having a downwardly-open notch 140' that is configured to securably engage a transverse pin 144 extending between a pair of tabs 142'.

If wing plow such as described in the '159 patent is to be employed along with a front-mounted plow, then not only is a tower such as described and illustrated in FIG. 5 needed, but the wing plow will also require a wing rear mounting structure to couple the rear structure associated with the wing plow to the vehicle. To quickly attach the wing rear mounting securely to the vehicle, it is preferred to attach the wing rear mounting structure to the vehicle via a side mounting assembly. The side mounting assembly has a side wing mounting block, which is configured to provide the appropriate mounting structure for coupling the back of the wing plow thereto, in combination with a mounting block securing mechanism mounted on the vehicle, which serves to engage the side wing mounting block and move it into a position where it can be secured to the vehicle. One such side mounting assembly is taught in the '159 patent, which illustrates a side wing mounting block equipped with a hook and a mounting block securing mechanism with a pivoting arm terminating in a bar that it pivoted up into engagement with the hook, this engagement serving to allow the arm to lift the side wing mounting block and swing it into a bracket to which it can then be secured by pins. However, greater freedom of positioning and ease of use can be attained by employing a side mounting assembly of the present invention as discussed below.

FIGS. 9-13 illustrate one embodiment of a side mounting assembly 200 of the present invention. The side mounting assembly 200 has a side wing mounting block 202 that has a side coupling structure 204 that is configured to be coupled to the conventional side mounting linkages of a wing plow (not shown); this structure provides a conventional connection coupling to the rear side structure that allows the wing plow to either be moved away from the vehicle to which the plow is mounted or be drawn in against the side of the vehicle. The side wing mounting block 202 also has a mounting block lift element, which in this embodiment is provided by a horizontal pin 206, and a mounting block mating surface 208 that faces away from the side coupling structure 204.

The side wing mounting block 202 in turn is engaged and lifted by a mounting block lifting and securing mechanism 210. The lifting and securing mechanism 210 has a base element 212 that can be affixed to the side of a vehicle (not shown) and which includes a bracket 214 into which the mounting block 202 can be secured.

The lifting and securing mechanism 210 has a slider 216 that is translatably mounted to the base element 212. A slide actuator 218, such as a hydraulic cylinder, is operably connected between the slider 216 and the base element to translate the slider 216 relative to the vehicle to which the base element 212 is affixed.

A lift arm 220 is pivotably mounted to the slider 216, providing the lift arm 220 with translational motion for increased flexibility compared to the mechanism of the '059 patent. The additional degree of motion provided by the slider 216 allows the operator to separate the actions of positioning the lift arm 220 at the correct angle to engage the side wing mounting block 202 and then moving it to the correct distance for such engagement.

The lift arm 220 is provided with an arm lift element configured to supportably engage the mounting block lift element; thus, in this embodiment, where the mounting block lift element is provided by the horizontal pin 206, the arm lift element is provided by a hook 222 for engaging the pin 206. It should be appreciated that the relative positions of the hook and the horizontal pin could be reversed.

Figure 9:
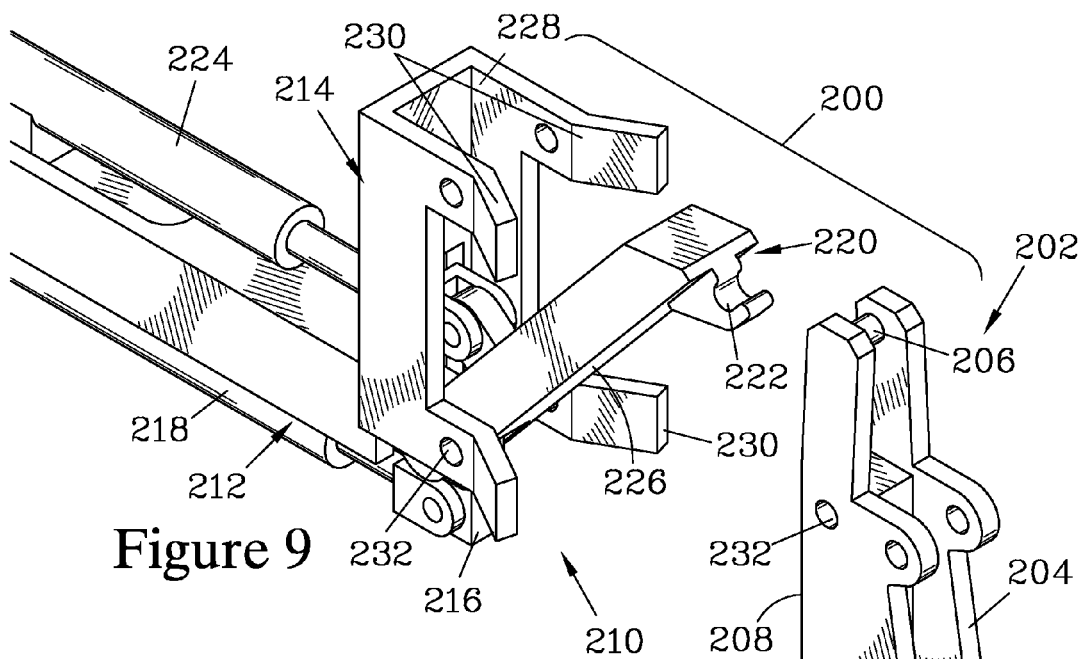
Figure 10:
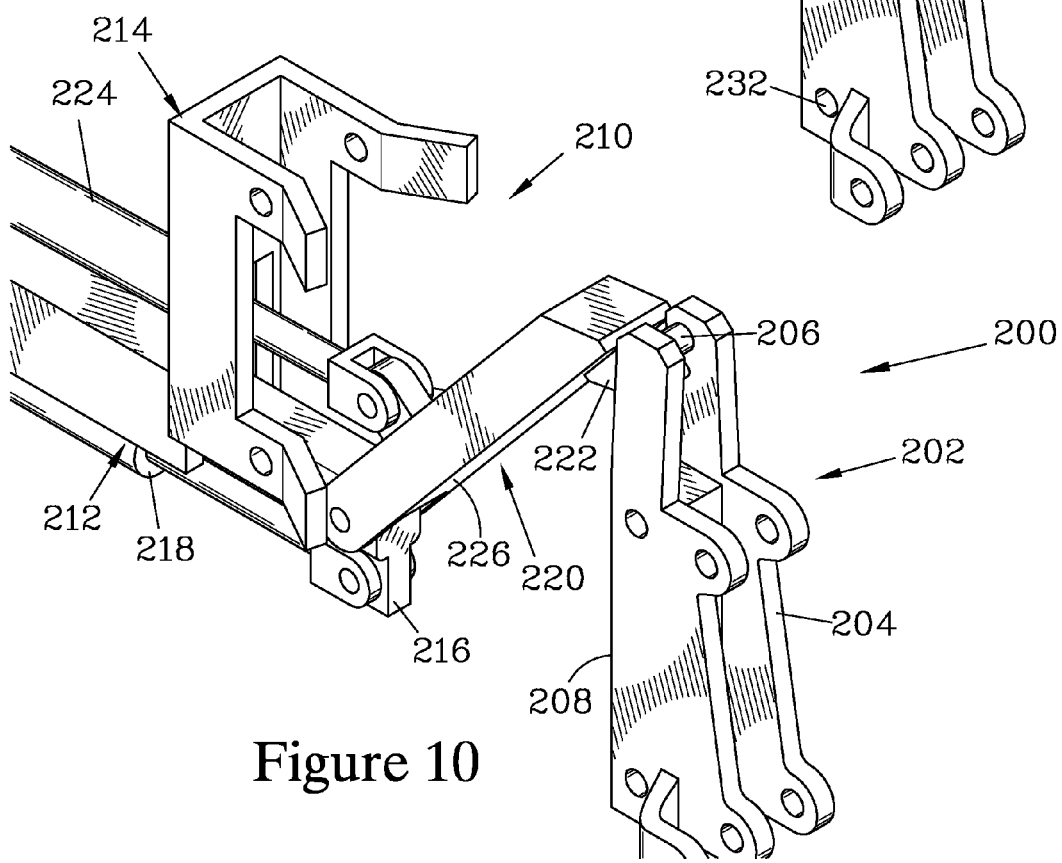
FIG. 10 illustrates the embodiment shown in FIG. 9 when a slider on which the lift arm is pivotably mounted has been translated to move the lift arm away from the base element and into position to engage the side wing mounting block.

The angle of the lift arm 220 relative to the slider 216 is adjusted by a pivot actuator 224 that is operably connected between the slider 216 and the lift arm 220 so as to raise and lower the lift arm 220 in a vertical plane (as illustrated in FIGS. 9-11). FIGS. 9 and 10 illustrate the lift arm 220 when it is in a lowered position, where it is substantially inclined and the hook 222 is at a suitable height to be brought into engagement with the pin 206 of the side wing mounting block 202. In the side mounting assembly 200, both of the actuators (218, 224) are provided by hydraulic cylinders. The pivot actuator 224 is mounted with respect to the slider 216 so as to decouple the pivoting motion that it provides from the translational motion of the slider 216.

In typical use, the lift arm 220 is first pivoted by extending the pivot actuator 224 to lower the hook 222 to an appropriate height to match the height of the pin 206 of the side wing mounting block 202, as shown in FIGS. 9 and 10. Once the lift arm 220 has been pivoted to achieve the desired height, the slide actuator 218 is extended as shown in FIG. 10 to translate the slider 216 outward from the base element 212. The pivot actuator 224 is mounted between the slider 216 and the lift arm 220, and thus the lift arm 220 and the slider 216 translate as a unit. The slide actuator 218 is extended far enough to move the hook 222 on the lift arm 220 into a position such that it either engages the pin 206 or resides slightly below the pin 206, in a position where is moved into engagement with the pin 206 when the lift arm 220 is subsequently pivoted upwards. Once the hook 222 has been positioned as desired, the pivot actuator 224 is retracted to raise the lift arm 220, and the hook 222 engages and lifts the pin 206, as shown in FIG. 11.

Preferably, the side wing mounting block 202 and the lift arm 220 are configured such that pivoting the lift arm 220 brings the mounting block mating surface 208 into engagement with an arm mating surface 226 on the lift arm 220. This engagement allows the lift arm 220 to support the side wing mounting block 202 when the lift arm 220 is pivoted slightly past a vertical position to a position where these mating surfaces (208, 226) are inclined with respect to the vertical by an angle $\alpha$ of about 5° (shown in FIG. 11). In this position, the side wing mounting block 202 is supported on the lift arm 220, stabilizing it during the subsequent motion. Depending on the relative positions of the lift arm 220 and the side wing mounting block 202, pivoting the lift arm 220 to this position may also bring a portion of the lift arm 220 into a portion of a channel 228 formed in the bracket 214, in turn drawing a portion of the side wing mounting block 202 between angled guides 230 that serve to guide the side wing mounting block 202 into alignment with the base element 212.

Once the lift arm 220 has been raised to lift and carry the side wing mounting block 202, as shown in FIG. 11, the slide actuator 218 is retracted to draw the lift arm 220 back inwards toward the vehicle, as shown in FIG. 12. The lift arm 220 draws the side wing mounting block 202 with it, into engagement with the angled guides 230 that serve to align the side wing mounting block 202 with the base element 212. As shown in FIG. 12, the slider 216 has not been fully retracted to pull the lift arm 220 into the base element 212, and the lift arm 220 remains in its inclined position. It has been found that such a slightly inclined position aids in bringing the side wing mounting block 202 into alignment with the base element 212, as the upper portion is first brought into alignment and then the lower portion. To fully retract the lift arm 220, it must be allowed to pivot back to a substantially vertical position to allow bringing the side wing mounting block 202 into a position where passages 232 in the base element 212 and the side wing mounting block 202 (shown in FIGS. 9-11) are aligned. This pivoting can be accommodated by incrementally releasing pressure on the pivot actuator 224 as the slide actuator 218 is fully retracted, and/or by providing a loose connection between the pivot actuator 224 and the lift arm 220.

Once the slider 216 has been fully retracted and the side wing mounting block 202 has been guided into position, as shown in FIG. 13, securing pins 234 can be inserted through the aligned passages 232 (shown in FIGS. 11 and 12 before alignment) to affix the side wing mounting block 202 to the base element 212, thereby affixing the side wing mounting block 202 to the vehicle on which the base element 212 is affixed.

While the combined pivoting and translational action of the side mounting assembly 200 provides greater freedom than prior art devices in the initial positioning of the side wing mounting block 202 relative to the base element 212, there may still be occasions when the extension of the slider 216 is not sufficient to bring the lift arm 220 into position to engage and lift the side wing mounting block 202 as the lift arm 220 is raised. In such cases, increased flexibility in positioning can be obtained as is illustrated in the side mounting assembly 200' shown in FIG. 14. In this embodiment, a lift arm 220' is provided with a chain hook 236, which can be conveniently stored inside a cavity (not shown) provided in the lift arm 220' when not in use. The chain hook 236 is attached to the lift arm 220' near the (rigid) hook 222, and when the lift arm 220' is pivoted outward from the base element 212', the chain hook 236 can be manually engaged with the pin 206 of the side wing mounting block 202. Thereafter, when the lift arm 220' is pivoted back to a raised position, the chain hook 236 will draw the side wing mounting block 202 closer to the base element 212', bringing it to a position where it can subsequently be engaged by the lift arm 220' in the manner illustrated in FIGS. 9-13 for the lift arm 220, after the chain hook 236 has been manually disengaged from the pin 206.

FIG. 14 also shows the base element 212' having sleeves 238 through which the passages 232' are provided, allowing easy access for the user to insert cotter pins 240 through the sleeves 238 and through the securing pins 234' (only one of which is shown) to retain the securing pins 234' in place. In contrast, the embodiment shown in FIGS. 9-13 requires the user to reach behind the structure to insert cotter pins (not shown) to retain the securing pins 234.

While the novel features of the present invention have been described in terms of particular embodiments and preferred applications, it should be appreciated by one skilled in the art that substitution of materials and modification of details can be made without departing from the spirit of the invention.

What I claim is:

1. A quick-release attachment system for securing a wing plow to the side of a vehicle, the wing plow having a front section which attaches to a wing plow tower which in turn is attached to a plow mounting frame on the vehicle, and the wing plow having a rear section coupled to a side mounting linkage system which adjusts the position of the rear section with respect to the vehicle to allow the rear section to be raised and positioned in close proximity to the vehicle and lowered to place the wing plow in a substantially horizontal position, the quick-release attachment system comprising:

a side wing mounting block having,
    a side coupling structure that is configured to couple to the side mounting linkage system associated with the wing plow, and
    a mounting block lift element;
a mounting block lifting and securing mechanism having,
    a base element affixable to a structural element of the vehicle, and configured to serve as a bracket into which said side wing mounting block can be received,
    a slider translatably mounted to said base element so as to be extendable and retractable with respect to the vehicle,
    a slide actuator operably connected between said base element and said slider to translate said slider with respect to the vehicle,
    a lift arm pivotably mounted to said slider and having an arm lift element that is engagable with said mounting block lift element,
    a pivot actuator operably connected between said slider and said lift arm for lowering and raising said lift arm, said lift arm being configured such that, when lowered, said arm lift element can be placed under said mounting block lift element and thereafter, as said lift arm is raised, said lift elements engage so as to carry said mounting block with said lift arm; and means for securing said side wing mounting block with respect to said base element when received therein.

2. The quick-release attachment system of claim 1 further comprising:

means for assuring that said side wing mounting block aligns with respect to said base element as said slider is retracted so as to translate said lift arm and said side wing mounting block towards the vehicle and carry said side wing mounting block into said base element.

3. The quick-release attachment system of claim 2 wherein said lift arm has an arm bearing surface thereon for engagement with said side wing mounting block and said lift elements being positioned and configured such that, when said lift elements are engaged and said lift arm is further raised, said side wing mounting block is brought into contact with said arm bearing surface of said lift arm so as to be supported thereon.

4. The quick-release attachment system of claim 3 wherein said lift arm is configured to raise said side wing mounting block such that said arm bearing surface can move past a vertical position to a slightly inclined position.

5. The quick-release attachment system of claim 2 wherein said means for securing said side wing mounting block with respect to said base element further comprises:

passages through said base element and said side wing mounting block that are aligned when said side wing mounting block is received in said base element; and securing pins that can be inserted through said aligned passages.

* * * * *